US011961476B2

(12) United States Patent
Pyun et al.

(10) Patent No.: US 11,961,476 B2
(45) Date of Patent: Apr. 16, 2024

(54) DISPLAY DEVICE AND METHOD OF DRIVING THE SAME

(71) Applicant: Samsung Display Co., LTD., Yongin-si (KR)

(72) Inventors: Kihyun Pyun, Gwangmyeong-si (KR); Seung-Woon Shin, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/136,469

(22) Filed: Apr. 19, 2023

(65) Prior Publication Data

US 2023/0419901 A1 Dec. 28, 2023

(30) Foreign Application Priority Data

Jun. 24, 2022 (KR) ........................ 10-2022-0077577

(51) Int. Cl.
*G09G 3/3233* (2016.01)
*G09G 3/20* (2006.01)

(52) U.S. Cl.
CPC ......... *G09G 3/3233* (2013.01); *G09G 3/2096* (2013.01); *G09G 2300/0842* (2013.01); *G09G 2330/021* (2013.01); *G09G 2330/028* (2013.01); *G09G 2354/00* (2013.01)

(58) Field of Classification Search
CPC ......... G09G 2330/028; G09G 2360/16; G09G 2330/021; G09G 3/3233; G09G 2320/0673; G09G 2320/0626; G09G 2320/0271
See application file for complete search history.

(56) References Cited

U.S. PATENT DOCUMENTS 8,884,941 B2 * 11/2014 Lee ........................ G09G 5/003 362/249.02
2018/0158397 A1 * 6/2018 Nam .................... G09G 3/3696

FOREIGN PATENT DOCUMENTS

| | | | |
|---|---|---|---|
| KR | 100685391 | B1 | 2/2007 |
| KR | 101294260 | B1 | 8/2013 |
| KR | 101883925 | B1 | 8/2018 |
| KR | 1020190079262 | A | 7/2019 |

* cited by examiner

*Primary Examiner* — Koosha Sharifi-Tafreshi
(74) *Attorney, Agent, or Firm* — CANTOR COLBURN LLP

(57) ABSTRACT

A display device includes a display panel which displays an image based on output image data converted from input image data, an input voltage controller which determines a maximum scale factor and a minimum scale factor based on a power control mode set by a user, calculates a maximum driving voltage based on the maximum scale factor and the minimum scale factor, and calculates an optimal voltage based on the maximum driving voltage, a power supply which generates an input voltage based on the optimal voltage, and a driving voltage generator which generates a driving voltage provided to the display panel using the input voltage.

20 Claims, 7 Drawing Sheets

DISPLAY DEVICE AND METHOD OF DRIVING THE SAME

This application claims priority to Korean Patent Application No. 10-2022-0077577, filed on Jun. 24, 2022, and all the benefits accruing therefrom under 35 U.S.C. § 119, the content of which in its entirety is herein incorporated by reference.

BACKGROUND

1. Field

Embodiments relate to a display device. More particularly, embodiments relate to a display device applied to various electronic apparatuses and a method of driving the display device.

2. Description of the Related Art

A display device may include a display panel for displaying an image, a driving voltage generator and a power supply for providing a driving voltage to the display panel, or the like.

The power supply may generate an input voltage using a voltage, e.g., an alternate current ("AC") voltage, provided from an outside, and may provide the input voltage to the driving voltage generator. The driving voltage generator may generate the driving voltage using the input voltage, and may provide the driving voltage to the display panel.

SUMMARY

In a display device, when a power supply thereof generates an input voltage that is excessively large compared to a driving voltage, power consumption of the power supply may increase. Accordingly, it may be desired to optimize the input voltage in consideration of the magnitude of the driving voltage.

Embodiments provide a display device in which an input voltage provided to a driving voltage generator is optimized, and a method of driving the display device.

A display device according to embodiments includes a display panel which displays an image based on output image data converted from input image data, an input voltage controller which determines a maximum scale factor and a minimum scale factor based on a power control mode set by a user, calculates a maximum driving voltage based on the maximum scale factor and the minimum scale factor, and calculates an optimal voltage based on the maximum driving voltage, a power supply which generates an input voltage based on the optimal voltage, and a driving voltage generator which generates a driving voltage p using the input voltage and provides the driving voltage to the display panel.

In an embodiment, the input voltage controller may include a scale factor determiner which determines the maximum scale factor and the minimum scale factor based on the power control mode, a maximum driving voltage calculator which calculates the maximum driving voltage based on the maximum scale factor and the minimum scale factor, and an input voltage calculator which calculates the optimal voltage based on the maximum driving voltage.

In an embodiment, the maximum driving voltage calculator may increase the maximum driving voltage as the maximum scale factor increases.

In an embodiment, the maximum driving voltage calculator may increase the maximum driving voltage as the minimum scale factor increases.

In an embodiment, the maximum driving voltage calculator may calculate the maximum driving voltage by referring to a first lookup table, which stores a preliminary maximum driving voltage corresponding to the maximum scale factor, and a second lookup table, which stores a driving voltage increase amount corresponding to the minimum scale factor.

In an embodiment, the maximum driving voltage calculator may calculate the maximum driving voltage by adding the driving voltage increase amount to the preliminary maximum driving voltage.

In an embodiment, the input voltage calculator may calculate the optimal voltage by adding a margin voltage to the maximum driving voltage.

In an embodiment, the margin voltage may be greater than or equal to a difference between the input voltage and the driving voltage.

In an embodiment, the power supply may generate the input voltage which is equal to the optimal voltage.

In an embodiment, the driving voltage generator may generate the driving voltage from the input voltage based on a load of the input image data and a maximum grayscale value of the input image data.

In an embodiment, the maximum scale factor may be a scale factor when a load of the input image data is a minimum load, and the minimum scale factor may be a scale factor when the load of the input image data is a maximum load.

In an embodiment, the display device may further include a power controller which calculates a scale factor corresponding to a load of the input image data from a scale factor curve selected based on the power control mode, and a timing controller which converts the input image data into the output image data using the scale factor.

A method of driving a display device according to embodiments includes determining a maximum scale factor and a minimum scale factor based on a power control mode set by a user, calculating a maximum driving voltage based on the maximum scale factor and the minimum scale factor, calculating an optimal voltage based on the maximum driving voltage, generating an input voltage based on the optimal voltage, and generating a driving voltage provided to a display panel using the input voltage.

In an embodiment, the maximum driving voltage may increase as the maximum scale factor increases.

In an embodiment, the maximum driving voltage may increase as the minimum scale factor increases.

In an embodiment, the maximum driving voltage may be calculated by referring to a first lookup table, which stores a preliminary maximum driving voltage corresponding to the maximum scale factor, and a second lookup table, which stores a driving voltage increase amount corresponding to the minimum scale factor.

In an embodiment, the maximum driving voltage may be calculated by adding the driving voltage increase amount to the preliminary maximum driving voltage.

In an embodiment, the optimal voltage may be calculated by adding a margin voltage to the maximum driving voltage.

In an embodiment, the margin voltage may be greater than or equal to a difference between the input voltage and the driving voltage.

In an embodiment, the input voltage may be equal to the optimal voltage.

In the display device and the method of driving the display device according to embodiments, the input voltage controller may calculate the optimal voltage based on the maximum driving voltage, and the power supply may generate the input voltage based on the optimal voltage, such that the power supply may provide the optimal input voltage to the driving voltage generator, and power consumption of the power supply may be reduced.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
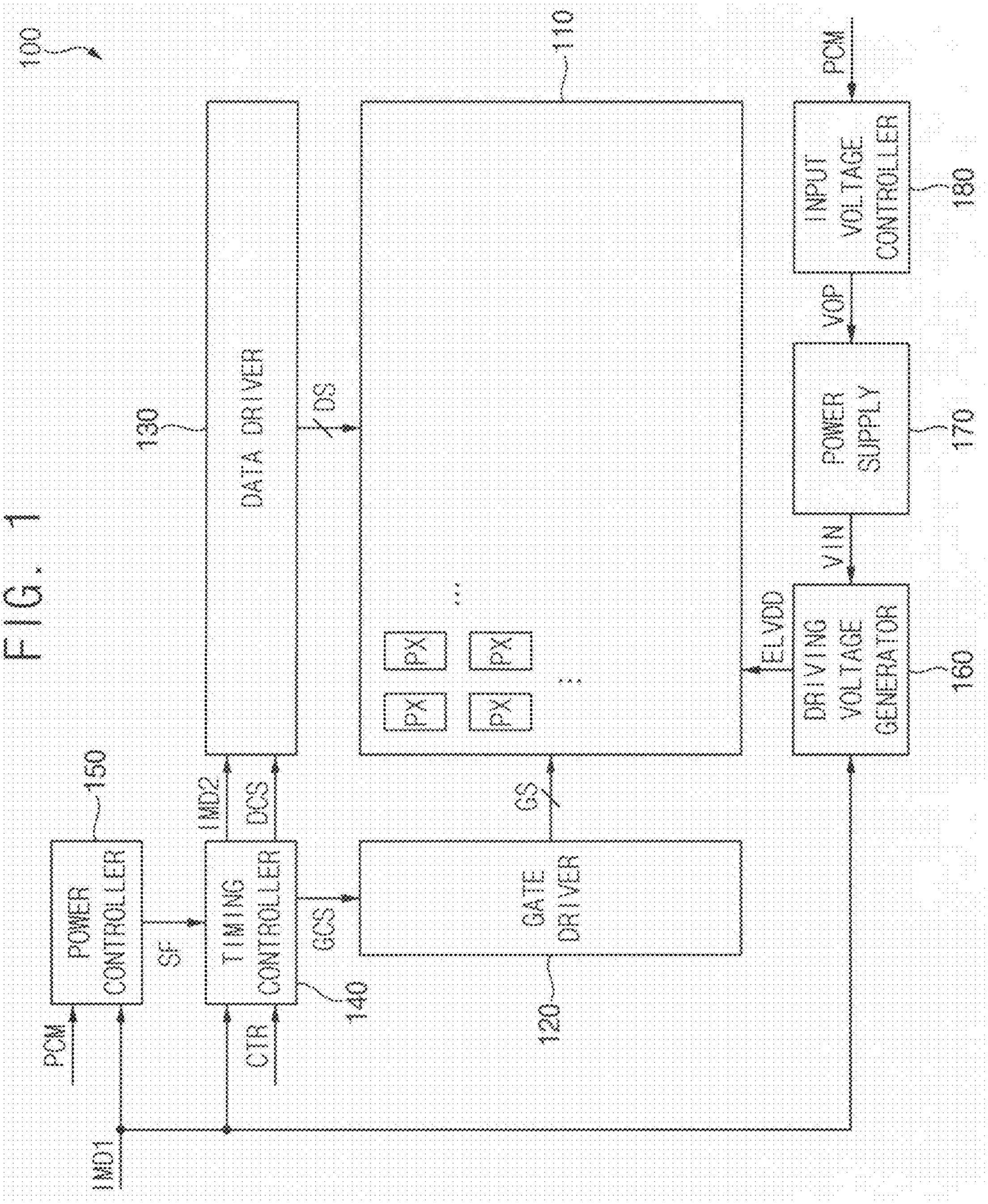
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

FIG. 1 is a block diagram illustrating a display device 100 according to an embodiment.

Referring to FIG. 1, an embodiment of a display device 100 may include a display panel 110, a gate driver 120, a data driver 130, a timing controller 140, a power controller 150, a driving voltage generator 160, a power supply 170, and an input voltage controller 180.

The display panel 110 may display an image based on output image data IMD2 converted from input image data IMD1. The display panel 110 may include at least one selected from various display elements such as an organic light emitting diode ("OLED") or the like. Hereinafter, embodiments where the display panel 110 includes the organic light emitting diode as a display element will be described for convenience. However, the disclosure is not limited thereto, and the display panel 110 may include at least one selected from various display elements such as a liquid crystal display ("LCD") element, an electrophoretic display ("EPD") element, an inorganic light emitting diode, a quantum dot light emitting diode, or the like.

The display panel 110 may include a plurality of pixels PX. Each of the pixels PX may be electrically connected to a data line DL in FIG. 2 and a gate line GL in FIG. 2. Further, each of the pixels PX may be electrically connected to a driving voltage line VDDL in FIG. 2 and a common voltage line VSSL in FIG. 2, and may receive a driving voltage ELVDD and a common voltage from the driving voltage line VDDL and the common voltage line VSSL, respectively. Each of the pixels PX may emit light with a luminance corresponding to a data signal DS provided through the data line DL in response to a gate signal GS provided through the gate line GL. The pixel PX will be described below in detail with reference to FIG. 2.

The gate driver 120 may generate the gate signals GS based on a gate control signal GCS, and may provide the gate signals GS to the display panel 110. The gate control signal GCS may include a gate start signal, a gate clock signal, or the like. The gate driver 120 may sequentially generate the gate signals GS in response to the gate start signal based on the gate clock signal.

The data driver 130 may generate the data signals DS based on the output image data IMD2 and a data control signal DCS, and may provide the data signals DS to the display panel 110. The output image data IMD2 may include grayscale values respectively corresponding to the pixels PX. The data control signal DCS may include a data start signal, a data clock signal, or the like.

The timing controller 140 may control driving of the gate driver 120 and driving of the data driver 130. The timing controller 140 may generate the output image data IMD2, the gate control signal GCS, and the data control signal DCS based on the input image data IMD1, a scale factor SF, and a control signal CTR. The input image data IMD1 may include grayscale values respectively corresponding to the pixels PX. The control signal CTR may include a vertical synchronization signal, a horizontal synchronization signal, a clock signal, a data enable signal, or the like.

The timing controller 140 may convert the input image data IMD1 into the output image data IMD2 using the scale factor SF. In an embodiment, the timing controller 140 may generate the grayscale values of the output image data IMD2 by scaling the grayscale values included in the input image data IMD1 using the scale factor SF.

The power controller 150 may calculate a load of the input image data IMD1, and may calculate the scale factor SF corresponding to the load of the input image data IMD1 from a scale factor curve selected based on a power control mode PCM. The power controller 150 may provide the scale factor SF to the timing controller 140. The power controller 150 will be described below in detail with reference to FIGS. 3, 4, and 5.

The driving voltage generator 160 may generate the driving voltage ELVDD by using an input voltage VIN based on the load of the input image data IMD1 and a maximum grayscale value of the input image data IMD1, and may provide the driving voltage ELVDD to the display panel 110. The driving voltage generator 160 will be described below in detail with reference to FIG. 6.

The power supply 170 may generate the input voltage VIN using an external voltage provided from the outside based on an optimal voltage VOP, and may provide the input voltage VIN to the driving voltage generator 160. In an embodiment, for example, the external voltage may be an AC voltage of about 220 volts (V). In an embodiment, the power supply 170 may generate the input voltage VIN equal to the optimal voltage VOP. In an embodiment, for example, when the optimal voltage VOP is about 32 V, the power supply 170 may generate the input voltage VIN of about 32 V.

The input voltage controller 180 may determine a maximum scale factor and a minimum scale factor based on the power control mode PCM, may calculate a maximum driving voltage based on the maximum scale factor and the minimum scale factor, and may calculate the optimal voltage VOP based on the maximum driving voltage. The input voltage controller 180 may provide the optimal voltage VOP to the power supply 170. The input voltage controller 180 will be described below with reference to FIGS. 7, 8, and 9.

Figure 2:
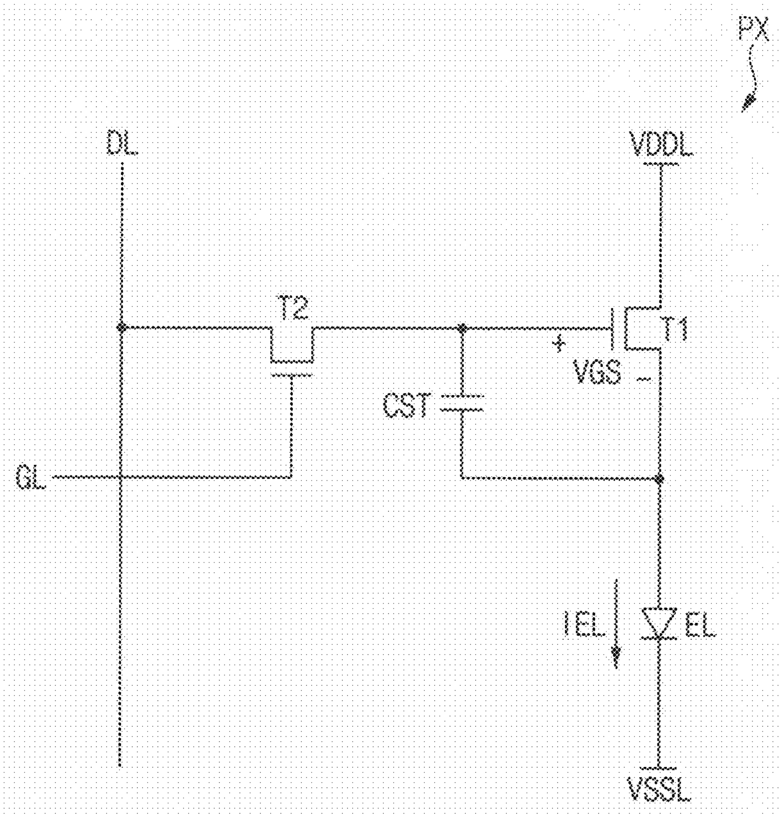
FIG. 2 is a circuit diagram illustrating an embodiment of a pixel included in the display device in FIG. 1.

FIG. 2 is a circuit diagram illustrating an embodiment of the pixel PX included in the display device 100 in FIG. 1.

Referring to FIG. 2, an embodiment of the pixel PX may include a first transistor T1, a second transistor T2, a storage capacitor CST, and a light emitting element EL.

The first transistor T1 may provide a driving current IEL to the light emitting element EL. A first electrode of the first transistor T1 may be connected to the driving voltage line VDDL, and a second electrode of the first transistor T1 may be connected to a first electrode of the light emitting element EL. A gate electrode of the first transistor T1 may be connected to a second electrode of the second transistor T2.

The second transistor T2 may provide the data signal DS to the first transistor T1. A first electrode of the second transistor T2 may be connected to the data line DL, and the second electrode of the second transistor T2 may be connected to the gate electrode of the first transistor T1. A gate electrode of the second transistor T2 may be connected to the gate line GL.

FIG. 2 illustrates an embodiment in which each of the first transistor T1 and the second transistor T2 is an N-type transistor (e.g., an N-type metal-oxide-semiconductor ("NMOS") transistor), but the disclosure is not limited thereto. In an alternative embodiment, at least one selected from the first transistor T1 and the second transistor T2 may be a P-type transistor (e.g., a P-type metal-oxide-semiconductor ("PMOS") transistor).

The storage capacitor CST may store the data signal DS. A first electrode of the storage capacitor CST may be connected to the second electrode of the first transistor T1, and a second electrode of the storage capacitor CST may be connected to the gate electrode of the first transistor T1.

FIG. 2 illustrates an embodiment in which the pixel PX includes two transistors T1 and T2 and a single capacitor CST, but the disclosure is not limited thereto. In an alternative embodiment, the pixel PX may include three or more transistors and/or two or more capacitors.

The light emitting element EL may emit light based on the driving current IEL. The first electrode of the light emitting element EL may be connected to the second electrode of the first transistor T1, and a second electrode of the light emitting element EL may be connected to the common voltage line VSSL.

Figure 3:
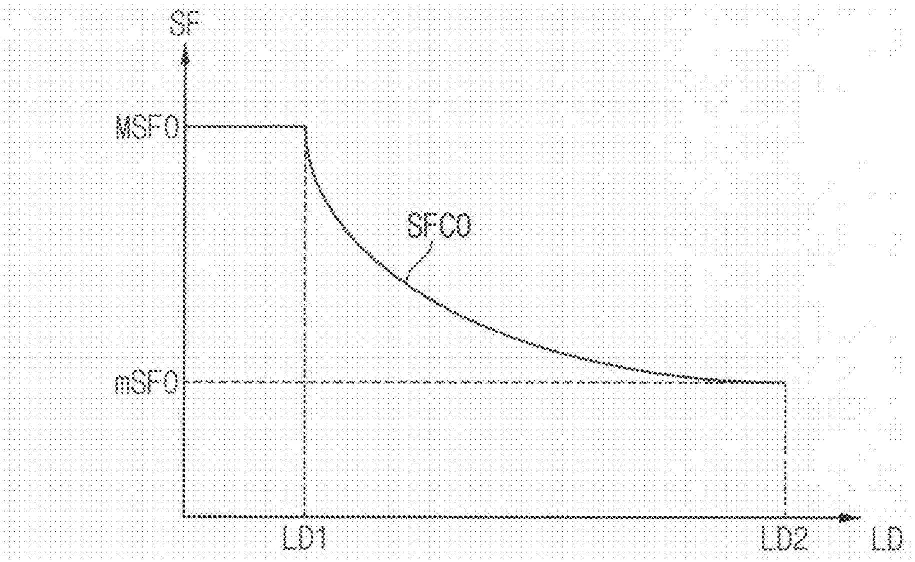
FIG. 3 is a graph illustrating a scale factor curve according to an embodiment.
Figure 4:
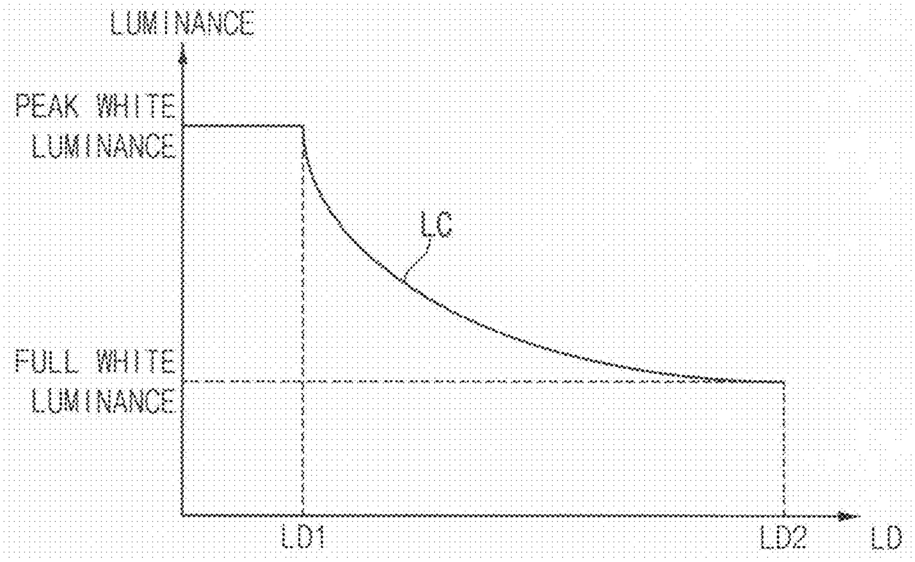
FIG. 4 is a graph illustrating a luminance curve corresponding to the scale factor curve in FIG. 3.

FIG. 3 is a graph illustrating a scale factor curve SFC0 according to an embodiment. FIG. 4 is a graph illustrating a luminance curve LC corresponding to the scale factor curve SFC0 in FIG. 3.

Referring to FIGS. 3 and 4, the scale factor curve SFC0 may represent a scale factor SF corresponding to the load LD of the input image data IMD1. The load LD of the input image data IMD1 may be a ratio of an average of the grayscale values included in the input image data IMD1 to a maximum grayscale. In an embodiment, the load LD of the input image data IMD1 may be 0% when an input image corresponding to the input image data IMD1 is a full black image, and the load LD of the input image data IMD1 may be 100% when an input image corresponding to the input image data IMD1 is a full white image.

The scale factor SF of the scale factor curve SFC0 may have a maximum scale factor MSF0 between a minimum load (e.g., 0%) and a first load LD1, and may have a minimum scale factor mSF0 at a second load LD2. The scale factor SF of the scale factor curve SFC0 may decrease from the maximum scale factor MSF0 to the minimum scale factor mSF0 between the first load LD1 and the second load LD2. In an embodiment, the first load LD1 and the second load LD2 may be 20% and 100%, respectively, and the maximum scale factor MSF0 and the minimum scale factor mSF0 may be 1.0 and 0.2, respectively.

The luminance curve LC may represent a luminance of an output image corresponding to the load LD of the input image data IMD1. The luminance of the luminance curve LC may have a peak white luminance between the minimum load and the first load LD1, and may have a full white luminance at the second load LD2. The luminance of the luminance curve LC may decrease from the peak white luminance to the full white luminance between the first load LD1 and the second load LD2. The peak white luminance may represent a luminance of a partial region of an output image corresponding to the output image data IMD2 when the load LD of the input image data IMD1 corresponding to an input image in which a partial region is a white image is less than or equal to the first load LD1. The full white luminance may represent a luminance of an output image corresponding to the output image data IMD2 when the load LD of the input image data IMD1 corresponding to an input image that is a full white image is the second load LD2.

The power controller 150 may provide the scale factor SF to the timing controller 140, and the timing controller 140 may scale grayscale values of the image data using the scale factor SF, so that the driving currents IEL flowing through the pixels PX may decrease. In an embodiment, for example, when the load LD of the input image data IMD1 is greater than the first load LD1, the power controller 150 may calculate a scale factor SF to be less than 1, and the timing controller 140 may decrease grayscale values of the image data using the scale factor SF less than 1, so that the luminance of the image may decrease. Accordingly, power consumption of the display device 100, which is proportional to the sum of the driving currents IEL flowing through the pixels PX, may be reduced.

Figure 5:
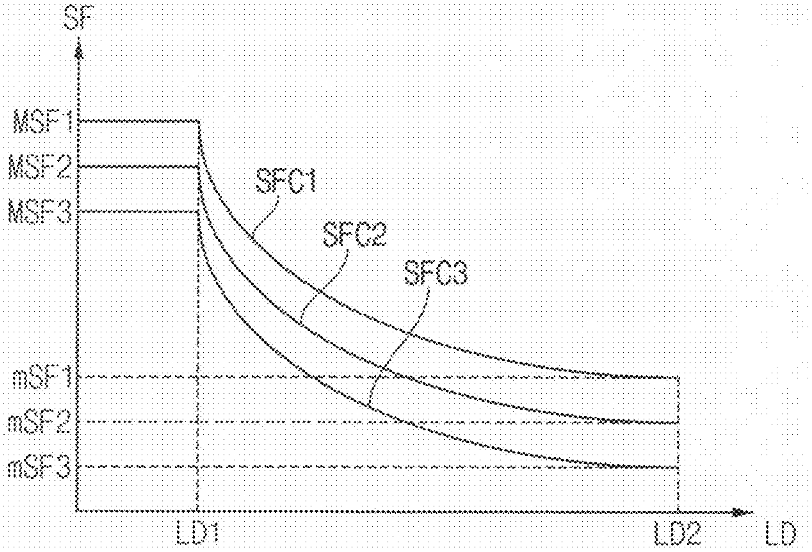
FIG. 5 is a graph illustrating scale factor curves according to an embodiment.

FIG. 5 is a graph illustrating scale factor curves SFC1, SFC2, and SFC3 according to an embodiment.

Referring to FIG. 5, one scale factor curve may be selected from a plurality of scale factor curves SFC1, SFC2, and SFC3 based on the power control mode PCM. The power control mode PCM may be set by the user. In an embodiment, the scale factor curves SFC1, SFC2, and SFC3 may include first to third scale factor curves SFC1, SFC2, and SFC3. Each of the first to third scale factor curves SFC1, SFC2, and SFC3 may represent a scale factor SF corresponding to the load LD of the input image data IMD1.

The first scale factor curve SFC1 may have a first maximum scale factor MSF1 between the minimum load and the first load LD1, may have a first minimum scale factor mSF1 at the second load LD2, and may decrease from the first maximum scale factor MSF1 to the first minimum scale factor mSF1 between the first load LD1 and the second load LD2. In an embodiment, the first maximum scale factor MSF1 and the first minimum scale factor mSF1 may be 1.0 and 0.3, respectively.

The second scale factor curve SFC2 may have a second maximum scale factor MSF2 between the minimum load and the first load LD1, may have a second minimum scale factor mSF2 at the second load LD2, and may decrease from the second maximum scale factor MSF2 to the second minimum scale factor mSF2 between the first load LD1 and the second load LD2. The second maximum scale factor MSF2 and the second minimum scale factor mSF2 may be smaller than the first maximum scale factor MSF1 and the first minimum scale factor mSF1, respectively. In an embodiment, the second maximum scale factor MSF2 and the second minimum scale factor mSF2 may be 0.9 and 0.2, respectively.

The third scale factor curve SFC3 may have a third maximum scale factor MSF3 between the minimum load and the first load LD1, may have a third minimum scale factor mSF3 at the second load LD2, and may decrease from the third maximum scale factor MSF3 to the third minimum scale factor mSF3 between the first load LD1 and the second load LD2. The third maximum scale factor MSF3 and the third minimum scale factor mSF3 may be smaller than the second maximum scale factor MSF2 and the second minimum scale factor mSF2, respectively. In an embodiment, the third maximum scale factor MSF3 and the third minimum scale factor mSF3 may be 0.8 and 0.1, respectively.

The power controller 150 may calculate the scale factor SF corresponding to the load LD of the input image data IMD1 from the scale factor curve selected based on the power control mode PCM among the first to third scale factor curves SFC1, SFC2, and SFC3. Accordingly, the luminance of the output image corresponding to the output image data IMD2 may be controlled. In an embodiment, for example, a power control mode PCM corresponding to the first scale factor curve SFC1 may be set to display an output image of high luminance, and a power control mode PCM corresponding to the third scale factor curve SFC3 may be set to reduce power consumption of the display device 100.

Figure 6:
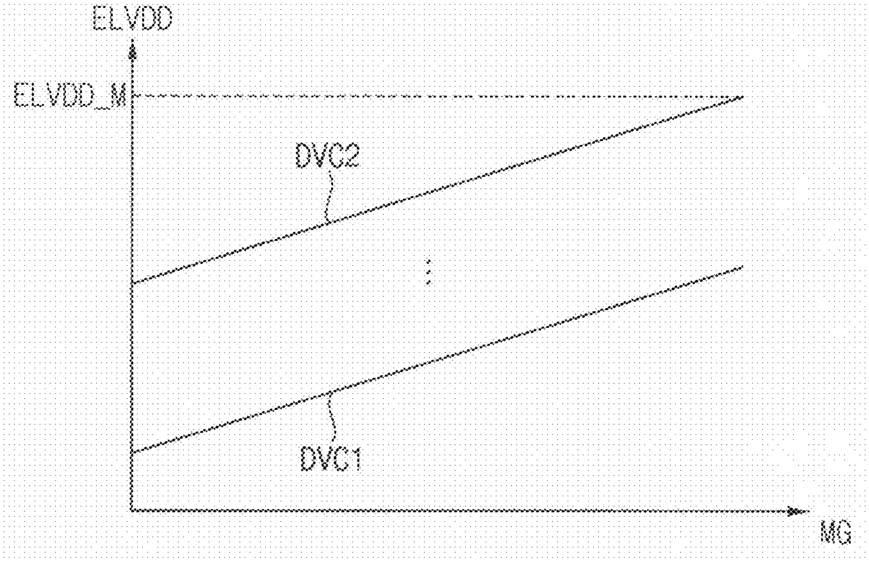
FIG. 6 is a graph illustrating driving voltage curves according to an embodiment.

FIG. 6 is a graph illustrating driving voltage curves DVC1, . . . , DVC2 according to an embodiment.

Referring to FIG. 6, each of driving voltage curves DVC1, . . . , DVC2 may represent a driving voltage ELVDD corresponding to a maximum grayscale value MG of the input image data IMD1. The maximum grayscale value MG of the input image data IMD1 may be the highest grayscale value among the grayscale values included in the input image data IMD1. The driving voltage curves DVC1, . . . , DVC2 may include a first driving voltage curve DVC1, a second driving voltage curve DVC2, or the like. The first driving voltage curve DVC1 may represent a driving voltage ELVDD corresponding to the maximum grayscale value MG when the load LD of the input image data IMD1 is the minimum load (e.g., 0%). The second driving voltage curve DVC2 may represent a driving voltage ELVDD corresponding to the maximum grayscale value MG when the load LD of the input image data IMD1 is the maximum load (e.g., 100%). Although not illustrated in FIG. 6, the driving voltage curves DVC1, . . . , DVC2 may further include additional driving voltage curves between the first driving voltage curve DVC1 and the second driving voltage curve DVC2. Each of the additional driving voltage curves may represent a driving voltage ELVDD corresponding to the maximum grayscale value MG when the load LD of the input image data IMD1 is greater than the minimum load and less than the maximum load.

Since a voltage drop amount of the driving voltage ELVDD increases as the load LD of the input image data IMD1 increases, the driving voltage ELVDD of the driving voltage curve may increase as the load LD of the input image data IMD1 increases. Further, since the luminance of the pixel PX to which the data signal DS corresponding to the maximum grayscale value MG is applied increases as the maximum grayscale value MG of the input image data IMD1 increases, the driving voltage ELVDD of each of the driving voltage curves DVC1, . . . , DVC2 may linearly increase from a minimum grayscale to a maximum grayscale.

The driving voltage generator 160 may determine the driving voltage ELVDD corresponding to the maximum grayscale value MG of the input image data IMD1 from the driving voltage curve corresponding to the load LD of the input image data IMD1. Accordingly, the driving voltage ELVDD may be controlled in consideration of the load LD and the maximum grayscale value MG of the input image data IMD1. Accordingly, the driving voltage ELVDD provided to the pixels PX may decrease, and power consumption of the display device 100, which is proportional to the driving voltage ELVDD, may be reduced.

The driving voltage generator 160 may generate the driving voltage ELVDD using the input voltage VIN. The driving voltage generator 160 may include a buck converter for converting the input voltage VIN into the driving voltage ELVDD. The buck converter is a direct current-to-direct current ("DC-DC") converter, and a direct current ("DC") output voltage output from the buck converter may be smaller than a DC input voltage input to the buck converter. Accordingly, the driving voltage ELVDD generated by the driving voltage generator 160 may be smaller than the input voltage VIN provided to the driving voltage generator 160.

Figure 7:
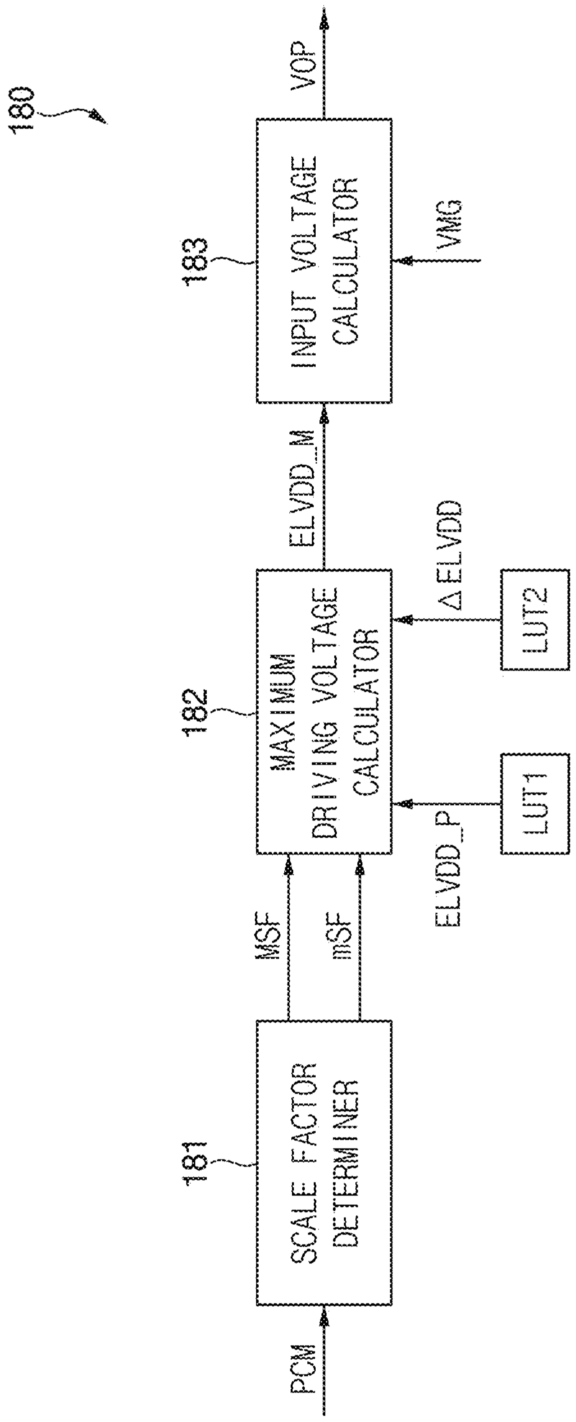
FIG. 7 is a block diagram illustrating an embodiment of an input voltage controller included in the display device in FIG. 1.
Figure 8:
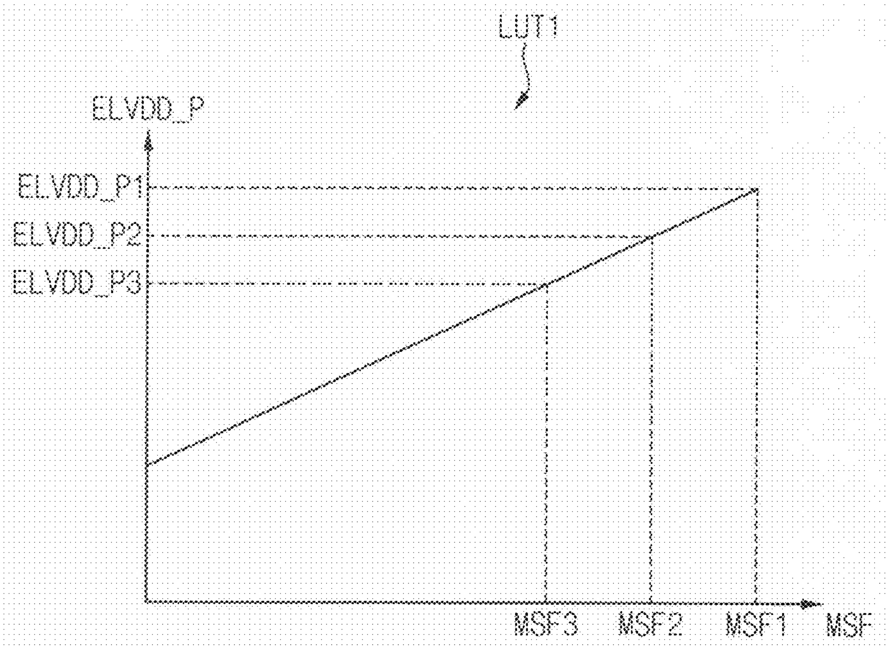
FIG. 8 is a graph illustrating a first lookup table according to an embodiment.
Figure 9:
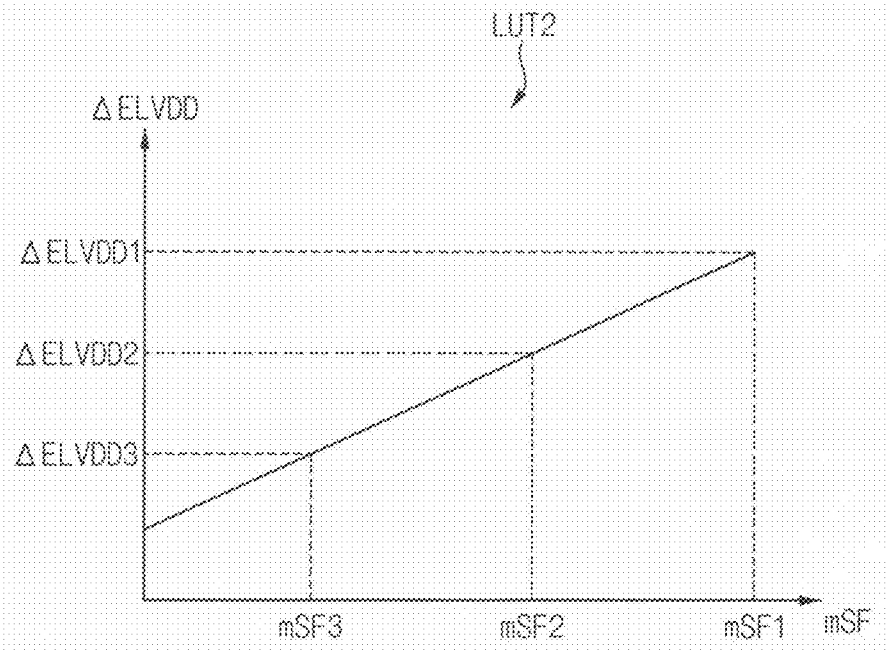
FIG. 9 is a graph illustrating a second lookup table according to an embodiment.

FIG. 7 is a block diagram illustrating an embodiment of the input voltage controller 180 included in the display device 100 in FIG. 1. FIG. 8 is a graph illustrating a first lookup table LUT1 according to an embodiment. FIG. 9 is a graph illustrating a second lookup table LUT2 according to an embodiment.

Referring to FIGS. 7, 8, and 9, an embodiment of the input voltage controller 180 may include a scale factor determiner 181, a maximum driving voltage calculator 182, and an input voltage calculator 183.

The scale factor determiner 181 may determine a maximum scale factor MSF and a minimum scale factor mSF based on the power control mode PCM. The maximum scale factor MSF may be a scale factor SF when the load LD of the input image data IMD1 is the minimum load, and the minimum scale factor mSF may be a scale factor SF when the load LD of the input image data IMD1 is the maximum load. When the first scale curve SFC1 is selected based on the power control mode PCM, the scale factor determiner 181 may determine the maximum scale factor MSF and the minimum scale factor mSF as the first maximum scale factor MSF1 and the first minimum scale factor mSF1, respectively. When the second scale curve SFC2 is selected based on the power control mode PCM, the scale factor determiner 181 may determine the maximum scale factor MSF and the minimum scale factor mSF as the second maximum scale factor MSF2 and the second minimum scale factor mSF2, respectively. When the third scale curve SFC3 is selected based on the power control mode PCM, the scale factor determiner 181 may determine the maximum scale factor MSF and the minimum scale factor mSF as the third maximum scale factor MSF3 and the third minimum scale factor mSF3, respectively.

The maximum driving voltage calculator 182 may calculate a maximum driving voltage ELVDD_M (shown in FIG. 6) based on the maximum scale factor MSF and the minimum scale factor mSF. The maximum driving voltage ELVDD_M may be an upper limit of the driving voltage ELVDD. In an embodiment, the maximum driving voltage ELVDD_M may be a driving voltage ELVDD corresponding to the maximum grayscale value MG of the input image data IMD1 having the maximum grayscale when the load LD of the input image data IMD1 is the maximum load.

The maximum driving voltage calculator 182 may calculate the maximum driving voltage ELVDD_M to be greater as the maximum scale factor MSF increases. Since the peak white luminance increases as the maximum scale factor MSF increases, the voltage of the data signal DS applied to the gate electrode of the first transistor T1 may increase as the maximum scale factor MSF increases. Accordingly, a voltage VGS between the gate electrode and the second electrode of the first transistor T1 may be large, and accordingly, an increase in the driving voltage ELVDD may be desired.

The maximum driving voltage calculator 182 may calculate the maximum driving voltage ELVDD_M to be greater as the minimum scale factor mSF increases. Since the full white luminance increases as the minimum scale factor mSF increases, the driving current IEL flowing through the light emitting element EL may increase as the minimum scale factor mSF increases. Accordingly, a voltage drop amount of the driving voltage line VDDL that transmits the driving voltage ELVDD may be large, and accordingly, an increase in the driving voltage ELVDD may be desired.

The maximum driving voltage calculator 182 may calculate the maximum driving voltage ELVDD_M by referring to a first lookup table LUT1 and a second lookup table LUT2. The first lookup table LUT1 may store a preliminary maximum driving voltage ELVDD_P corresponding to the maximum scale factor MSF. A correspondence between the maximum scale factor MSF and the preliminary maximum driving voltage ELVDD_P may be expressed as a graph of a linear function. Accordingly, a second preliminary maximum driving voltage ELVDD_P2 corresponding to the second maximum scale factor MSF2 may be greater than a third preliminary maximum driving voltage ELVDD_P3 corresponding to the third maximum scale factor MSF3, and a first preliminary maximum driving voltage ELVDD_P1 corresponding to the first maximum scale factor MSF1 may be greater than the second preliminary maximum driving voltage ELVDD_P2 corresponding to the second maximum scale factor MSF2. In an embodiment, the first preliminary maximum driving voltage ELVDD_P1, the second preliminary maximum driving voltage ELVDD_P2, and the third preliminary maximum driving voltage ELVDD_P3 may be about 21 V, about 20.5 V, and about 20 V, respectively.

The second lookup table LUT2 may store a driving voltage increase amount ΔELVDD corresponding to the minimum scale factor mSF. A correspondence between the minimum scale factor mSF and the driving voltage increase amount ΔELVDD may be expressed as a graph of a linear function. Accordingly, a second driving voltage increase amount ΔELVDD2 corresponding to the second minimum scale factor mSF2 may be greater than a third driving voltage increase amount ΔELVDD3 corresponding to the third minimum scale factor mSF3, and a first driving voltage increase amount ΔELVDD1 corresponding to the first minimum scale factor mSF1 may be greater than the second driving voltage increase amount ΔELVDD2 corresponding to the second minimum scale factor mSF2. In an embodiment, the first driving voltage increase amount ΔELVDD1, the second driving voltage increase amount ΔELVDD2, and the third driving voltage increase amount ΔELVDD3 may be about 3V, about 2V, and about 1V, respectively.

The maximum driving voltage calculator 182 may calculate the maximum driving voltage ELVDD_M by adding the driving voltage increment ΔELVDD to the preliminary maximum driving voltage ELVDD_P. When the first scale curve SFC1 is selected based on the power control mode PCM, the maximum driving voltage calculator 182 may calculate the maximum driving voltage ELVDD_M by adding the first driving voltage increase amount ΔELVDD1 to the first preliminary maximum driving voltage ELVDD_P1. In an embodiment, for example, the maximum driving voltage calculator 182 may calculate the maximum driving voltage ELVDD_M as about 24 V (=21 V+3 V) when the first scale curve SFC1 is selected. When the second scale curve SFC2 is selected based on the power control mode PCM, the maximum driving voltage calculator 182 may calculate the maximum driving voltage ELVDD_M by adding the second driving voltage increase amount ΔELVDD2 to the second preliminary maximum driving voltage ELVDD_P2. In an embodiment, for example, the maximum driving voltage calculator 182 may calculate the maximum driving voltage ELVDD_M as about 22.5 V (=20.5 V+2 V) when the second scale curve SFC2 is selected. When the third scale curve SFC3 is selected based on the power control mode PCM, the maximum driving voltage calculator 182 may calculate the maximum driving voltage ELVDD_M by adding the third driving voltage increase amount ΔELVDD3 to the third preliminary maximum driving voltage ELVDD_P3. In an embodiment, for example, the maximum driving voltage calculator 182 may calculate the maximum driving voltage ELVDD_M as about 21 V (=20 V+1 V) when the third scale curve SFC3 is selected.

The input voltage calculator 183 may calculate the optimal voltage VOP based on the maximum driving voltage ELVDD_M. The input voltage calculator 183 may calculate the optimal voltage VOP by adding a margin voltage VMG to the maximum driving voltage ELVDD_M. The margin voltage VMG may be greater than or equal to a difference between the input voltage VIN and the driving voltage ELVDD. In an embodiment, as described above, the driving voltage generator 160 may include the buck converter, and accordingly, the driving voltage ELVDD output from the driving voltage generator 160 may be less than the input voltage VIN input to the driving voltage generator 160. Accordingly, the input voltage calculator 183 may calculate the optimal voltage VOP by adding the margin voltage VMG to the maximum driving voltage ELVDD_M in consideration of a voltage reduction occurred in the driving voltage generator 160.

In an embodiment, the margin voltage VMG may be about 5 V. In an embodiment, for example, when the first scale curve SFC1 is selected based on the power control mode PCM, the input voltage calculator 183 may calculate the optimal voltage VOP as about 29 V (=24 V+5 V). In an embodiment, for example, when the second scale curve SFC2 is selected based on the power control mode PCM, the input voltage calculator 183 may calculate the optimal voltage VOP as about 27.5 V (=22.5 V+5 V). In an embodiment, for example, when the third scale curve SFC3 is selected based on the power control mode PCM, the input voltage calculator 183 may calculate the optimal voltage VOP as about 26 V (=21 V+5 V).

Figure 10:
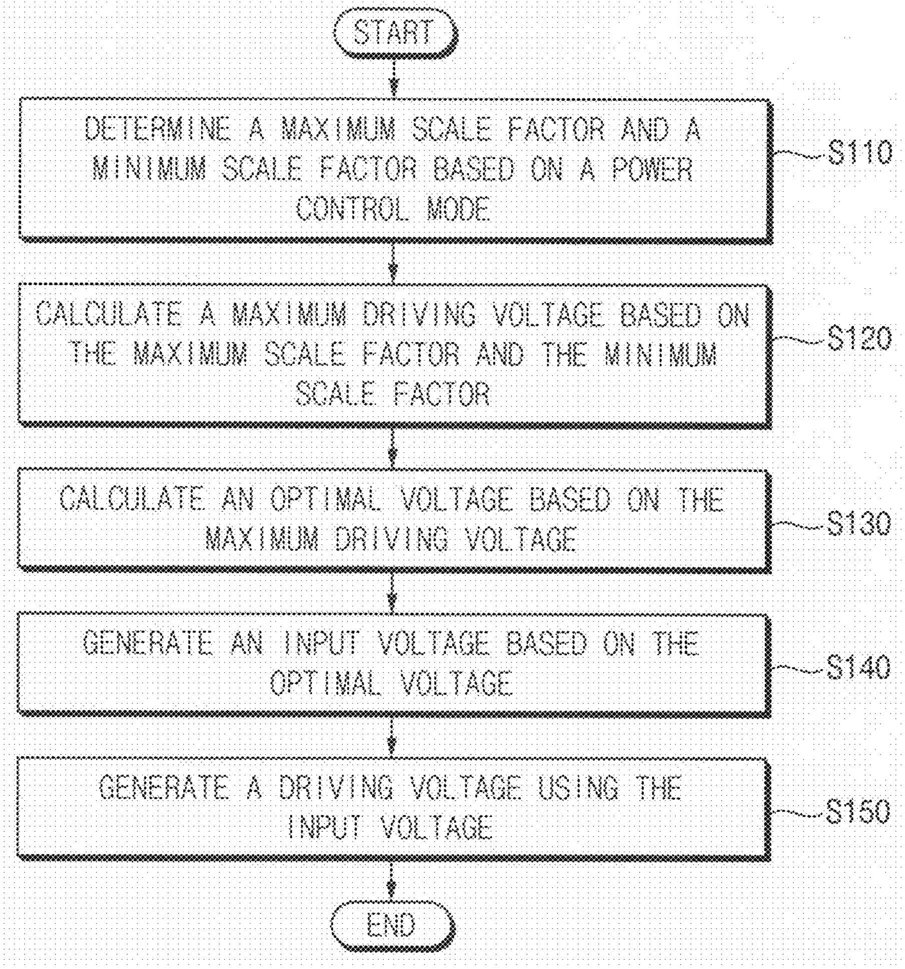
FIG. 10 is a flowchart illustrating a method of driving a display device according to an embodiment.

FIG. 10 is a flowchart illustrating a method of driving a display device according to an embodiment.

Referring to FIGS. 7 and 10, in an embodiment of the method of driving the display device, the scale factor determiner 181 may determine the maximum scale factor MSF and the minimum scale factor mSF based on the power control mode PCM set by the user (S110).

The maximum driving voltage calculator 182 may calculate the maximum driving voltage ELVDD_M based on the maximum scale factor MSF and the minimum scale factor mSF (S120). The maximum driving voltage calculator 182 may calculate the maximum driving voltage ELVDD_M to be greater as the maximum scale factor MSF increases. The maximum driving voltage calculator 182 may calculate the maximum driving voltage ELVDD_M to be greater as the minimum scale factor mSF increases.

The maximum driving voltage calculator 182 may calculate the maximum driving voltage ELVDD_M by referring to the first lookup table LUT1 that stores the preliminary maximum driving voltage ELVDD_P corresponding to the maximum scale factor MSF and the second lookup table LUT2 that stores the driving voltage increase amount ΔELVDD corresponding to the minimum scale factor mSF. The maximum driving voltage calculator 182 may calculate the maximum driving voltage ELVDD_M by adding the driving voltage increase amount ΔELVDD to the preliminary maximum driving voltage ELVDD_P.

The input voltage calculator 183 may calculate the optimal voltage VOP based on the maximum driving voltage ELVDD_M (S130). The input voltage calculator 183 may calculate the optimal voltage VOP by adding the margin voltage VMG to the maximum driving voltage ELVDD_M. The margin voltage VMG may be greater than or equal to the difference between the input voltage VIN and the driving voltage ELVDD.

Referring to FIGS. 1 and 10, the power supply 170 may generate the input voltage VIN using an external voltage provided from the outside based on the optimal voltage VOP (S140). In an embodiment, the power supply 170 may generate the input voltage VIN equal to the optimal voltage VOP.

The driving voltage generator 160 may generate the driving voltage ELVDD using the input voltage VIN based on the load of the input image data IMD1 and the maximum grayscale value of the input image data IMD1 (S150).

The display device according to embodiments may be applied to a display device included in a computer, a notebook, a mobile phone, a smart phone, a smart pad, a portable media player ("PMP"), a personal digital assistant ("PDA"), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device, comprising:

a display panel which displays an image based on output image data converted from input image data;

an input voltage controller which determines a maximum scale factor and a minimum scale factor based on a power control mode set by a user, calculates a maximum driving voltage based on the maximum scale factor and the minimum scale factor, and calculates an optimal voltage based on the maximum driving voltage;

a power supply which generates an input voltage based on the optimal voltage; and a driving voltage generator which generates a driving voltage using the input voltage and provides the driving voltage to the display panel.

2. The display device of claim 1, wherein the input voltage controller includes:

a scale factor determiner which determines the maximum scale factor and the minimum scale factor based on the power control mode;

a maximum driving voltage calculator which calculates the maximum driving voltage based on the maximum scale factor and the minimum scale factor; and an input voltage calculator which calculates the optimal voltage based on the maximum driving voltage.

3. The display device of claim 2, wherein the maximum driving voltage calculator increases the maximum driving voltage as the maximum scale factor increases.

4. The display device of claim 2, wherein the maximum driving voltage calculator increases the maximum driving voltage as the minimum scale factor increases.

5. The display device of claim 2, wherein the maximum driving voltage calculator calculates the maximum driving voltage by referring to a first lookup table, which stores a preliminary maximum driving voltage corresponding to the maximum scale factor, and a second lookup table, which stores a driving voltage increase amount corresponding to the minimum scale factor.

6. The display device of claim 5, wherein the maximum driving voltage calculator calculates the maximum driving voltage by adding the driving voltage increase amount to the preliminary maximum driving voltage.

7. The display device of claim 2, wherein the input voltage calculator calculates the optimal voltage by adding a margin voltage to the maximum driving voltage.

8. The display device of claim 7, wherein the margin voltage is greater than or equal to a difference between the input voltage and the driving voltage.

9. The display device of claim 1, wherein the power supply generates the input voltage which is equal to the optimal voltage.

10. The display device of claim 1, wherein the driving voltage generator generates the driving voltage from the input voltage based on a load of the input image data and a maximum grayscale value of the input image data.

11. The display device of claim 1, wherein the maximum scale factor is a scale factor when a load of the input image data is a minimum load, and wherein the minimum scale factor is a scale factor when the load of the input image data is a maximum load.

12. The display device of claim 1, further comprising:

a power controller which calculates a scale factor corresponding to a load of the input image data from a scale factor curve selected based on the power control mode; and a timing controller which converts the input image data into the output image data using the scale factor.

13. A method of driving a display device, the method comprising:

determining a maximum scale factor and a minimum scale factor based on a power control mode set by a user;

calculating a maximum driving voltage based on the maximum scale factor and the minimum scale factor;

calculating an optimal voltage based on the maximum driving voltage;

generating an input voltage based on the optimal voltage; and generating a driving voltage provided to a display panel using the input voltage.

14. The method of claim 13, wherein the maximum driving voltage increases as the maximum scale factor increases.

15. The method of claim 13, wherein the maximum driving voltage increases as the minimum scale factor increases.

16. The method of claim 13, wherein the maximum driving voltage is calculated by referring to a first lookup table, which stores a preliminary maximum driving voltage corresponding to the maximum scale factor, and a second lookup table, which stores a driving voltage increase amount corresponding to the minimum scale factor.

17. The method of claim 16, wherein the maximum driving voltage is calculated by adding the driving voltage increase amount to the preliminary maximum driving voltage.

18. The method of claim 13, wherein the optimal voltage is calculated by adding a margin voltage to the maximum driving voltage.

19. The method of claim 18, wherein the margin voltage is greater than or equal to a difference between the input voltage and the driving voltage.

20. The method of claim 13, wherein the input voltage is equal to the optimal voltage.

* * * * *